United States Patent

[11] 3,569,846

[72] Inventor Teruaki Matsuura
Tokyo-To, Japan
[21] Appl. No. 779,534
[22] Filed Nov. 27, 1968
[45] Patented Mar. 9, 1971
[73] Assignee Nippon Electric Company, Limited
Tokyo, Japan
[32] Priority Dec. 1, 1967
[33] Japan
[31] 42/77303

[54] FREQUENCY DISCRIMINATOR APPARATUS
4 Claims, 4 Drawing Figs.

[52] U.S. Cl. .......... 329/140, 333/75
[51] Int. Cl. .......... H03d 3/26
[50] Field of Search .......... 325/320, 462, 489; 329/139, 140, 194; 333/75

[56] References Cited

UNITED STATES PATENTS

| | | | |
|---|---|---|---|
| 3,076,940 | 2/1963 | Davis et al. .......... | 329/140 |
| 3,475,690 | 10/1969 | Hurtig .......... | 329/140X |

*Primary Examiner*—Roy Lake
*Assistant Examiner*—Lawrence J. Dahl
*Attorney*—Marn & Jangarathis

ABSTRACT: Wide band frequency discriminator apparatus is provided in accordance with the invention wherein a plurality of two terminal network means are combined with other impedance means to form four terminal circuit means which exhibit constant resistance. The four terminal circuit means are then combined with detector means to form respectively the branching circuits of wide band frequency discriminator apparatus which manifests high demodulation sensitivity throughout the frequency range thereof.

INVENTOR.
Teruaki Matsuura
BY
Marn & Jangarathis
ATTORNEYS

INVENTOR.
Teruaki Matsuura
BY
Marn & Jangarathis
ATTORNEYS

FREQUENCY DISCRIMINATOR APPARATUS

This invention relates to frequency discriminator apparatus and more particularly to frequency discriminator apparatus of the constant resistance variety.

Conventional frequency discriminator apparatus, presently in use today, generally comprises a pair of branch circuits whose input and output terminals are connected in parallel so that the output signals of such pair of branch circuits may be differentially detected and combined. Each branch circuit therein normally includes parallel tuned circuit means and detector circuit means wherein the selected parallel resonant frequency or antiresonant frequency for each of said parallel tuned circuit means is different, to thereby enable the desired differential detector output characteristics to be obtained.

Although such conventional frequency discriminator apparatus have been traditionally limited to a rather narrow frequency range of practical operation, satisfactory results have been achieved therewith in conjunction with frequency division multiplex telephony systems which do not utilize more than 960 channels. However, as the differential gain characteristic of such conventional frequency discriminator apparatus cannot be extended over a wide frequency range without impairing demodulation sensitivity and further as the delay characteristic thereof is not flat over a wide frequency range but instead tends to resemble the curve produced by a quadratic equation, the aforementioned frequency discriminator apparatus cannot be utilized in larger frequency-division multiplex telephony systems, for instance those requiring the demodulation of as many as 1800 channels, without substantial modification and compensation.

One technique utilized by those of ordinary skill in the art for modifying the foregoing frequency discriminator apparatus to admit of use in larger telephony systems has been to lower the $Q$ of the two parallel tuned circuits present in the branch circuits of the discriminator apparatus and in addition to couple a further parallel tuned circuit to the input of the frequency discriminator apparatus with a transistor amplifier to compensate for nonlinearities in the differential gain characteristic. However, as the function of the transistor amplifier is to increase the signal voltage applied to the detectors present in each branch circuit and thus increase the detection sensitivity to compensate for the decrease in the demodulation sensitivity caused by the reduction in $Q$ expensive high power transistors having excellent high frequency characteristics must be used. In addition, despite the reduction of the value of $Q$ in the two branch parallel tuned circuits, an appreciable nonlinear delay characteristic, resembling the curve produced by a quadratic equation, is also manifested by such frequency discriminator apparatus which requires the introduction of phase equalizer means therein to compensate for the phase distortion caused by the delay introduced thereby. Thus it will be seen that conventional frequency discriminator apparatus may not be easily and practically extended for operation over a wide frequency range without the introduction of severe sensitivity and compensation problems therein.

Therefore, it is a principal object of this invention to provide wide band frequency discriminator apparatus characterized by high demodulation sensitivity throughout the frequency range thereof.

A further object of this invention is to provide frequency discriminator apparatus capable of maintaining a substantially constant differential gain characteristic over a relatively wide frequency range without impairing the demodulation sensitivity thereof.

A further object of this invention is to provide frequency discriminator apparatus having a relatively flat delay characteristic over a wide frequency range such that no compensation for phase distortion is necessary.

A further object of this invention is to provide frequency discriminator apparatus employing four terminal constant resistance circuit means whereby the occurrence of echo distortion is minimized.

Other objects and advantages of the invention will become clear from the following detailed description of an embodiment thereof, and the novel features will be particularly pointed out in connection with the appended claims.

In accordance with this invention, wide band frequency discriminator apparatus comprising two branch circuit means connected in parallel is provided wherein two terminal network means are formed in combination with other impedance means into four terminal circuit means which exhibit constant resistance; the constant resistance four terminal circuit means thus formed are then connected to detector means to respectively form said branch circuit means of said wide band frequency discriminator apparatus. The invention will be more clearly understood by reference to the following detailed description of an embodiment thereof in conjunction with the accompanying drawing, in which:

Figure 1:
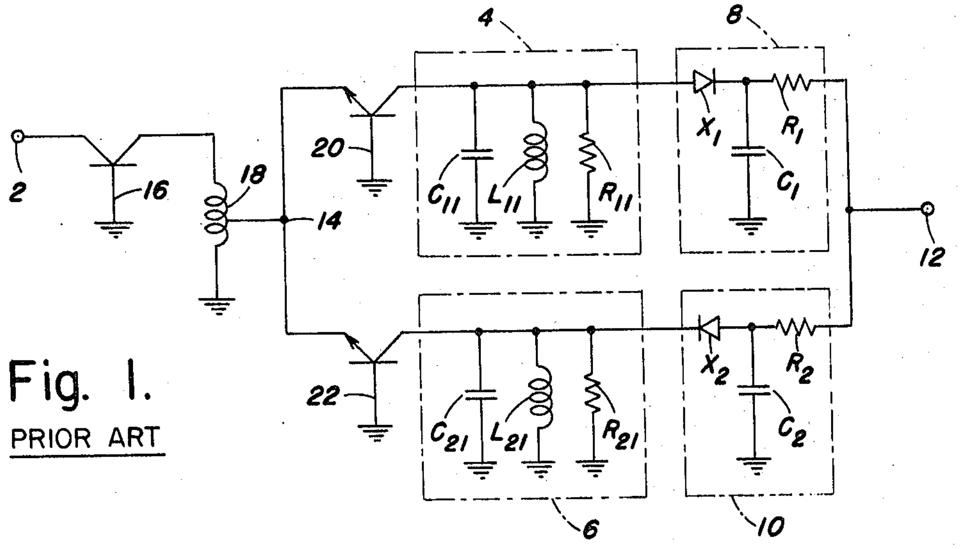
Fig. 1. PRIOR ART
FIG. 1 is a schematic circuit diagram of conventional frequency discriminator apparatus.

Referring now to the drawing, and more particularly to FIG. 1 thereof, there is shown a schematic circuit diagram of a conventional form of frequency discriminator apparatus. As shown in FIG. 1, the depicted frequency discriminator apparatus comprises input terminal means 2, first and second parallel tuned circuit means 4 and 6 respectively, first and second detector circuit means 8 and 10 respectively, and output terminal means 12. The input terminal means 2, is coupled to the junction point 14 of the symmetrical portion of the depicted frequency discriminator apparatus through an amplifying stage 16, which may be a transistor amplifier in a common base configuration as shown, and coupling means 18. The junction point 14 is connected to a first branch circuit of the depicted frequency discriminator apparatus which comprises first amplifying means 20, first tuned circuit means 4 and first detector circuit means 8. In addition, the junction point 14 is further connected to the second branch circuit of the depicted frequency discriminator apparatus which comprises second amplifying means 22, second tuned circuit means 6 and second detector circuit means 10. The output of the first and second branching circuits as present at resistors $R_1$ and $R_2$ respectively are connected to the output terminal means 12. Thus it will be seen that the first and second branching circuits are symmetrical in character and furthermore, are connected in parallel between the junction point 14 and the output terminal means 12.

The first and second amplifying means 20 and 22 may take the form of the common base transistor amplifier configurations as shown and the collector, output electrodes thereof are connected to the input portions of the first and second terminal circuit means 6 respectively. The first and second tuned circuit means 4 and 6 each comprise parallel tuned circuits comprising a capacitive branch $C_{11}$ or $C_{21}$, an inductive branch $L_{11}$ or $L_{21}$, and a resistive branch $R_{11}$ or $R_{21}$ respectively, which parallel tuned circuits are adapted to exhibit parallel resonance or antiresonance at the selected angular frequencies of $\omega_1$ or $\omega_2$ respectively. The outputs of the first and second tuned circuit means 4 and 6 are connected to the input portions of the first and second detector circuit means 8 and 10 respectively, which comprise a diode $X_1$ or $X_2$, a capacitor $C_1$ or $C_2$, and a resistor $R_1$ or $R_2$ respectively. The outputs of the first and second detector circuit means 8 and 10 are each connected to the output terminal means 12 as aforesaid so that the output signals of the detector circuit means 8 and 10 are differentially detected and combined.

In operation, the frequency discriminator apparatus depicted in FIG. 1 receives FM input signals applied to the input terminal means 2 by portions of the receiver apparatus external to the illustrated frequency discriminator apparatus. The FM input signals, as applied to input terminal means 2 receive suitable amplification at the amplifying stage 16 and are thereafter applied to junction point 14 via coupling means 18. FM signals received at the junction point 14 divide into first and second portions between the first and second branch circuits respectively connected thereto and hence each portion of said FM signals, as divided, has a suitable gain applied thereto by either the first 20 or second 22 amplifying means present in the respective branch circuits. The first portion of said suitably amplified FM signals are then applied to the first tuned circuit means 4 which will selectively alter such signals and apply the same to the first detector circuit means 8 depending on their relationship to the parallel resonant angular frequency $\omega_1$ thereof. The first detector circuit means 8 acts in the well-known manner upon the signals applied thereto by said first tuned circuit means 4 to produce an output voltage whose amplitude will vary with the applied frequency about a given reference level which occurs at the center angular frequency $\omega_0$. The second portion of said suitably amplified FM signals are in similar manner applied to the second tuned circuit means 6 which is tuned to a second parallel resonant angular frequency $\omega_2$ and selectively alters such signals and applies them to the second detector circuit means 10 depending upon their relationship to such second parallel resonant angular frequency $\omega_2$. The second detector circuit means 10 acts in the well-known manner upon the signals applied thereto by said second tuned circuit means 6 to produce an output voltage whose amplitude will vary with the applied frequency about the same given reference level which again occurs at the center angular frequency $\omega_0$. The output signals of the first 8 and second 10 detector circuit means are then applied to the output terminal means 12 whereupon the outputs are differentially detected and combined. The resultant output which may be derived from output terminal means 12 is representative of the desired demodulated information.

As previously mentioned, conventional frequency discriminator apparatus, similar to that depicted in FIG. 1, have been traditionally limited to a rather narrow frequency range of practical operation whereby satisfactory results can only be achieved therewith in conjunction with frequency-division multiplex telephony systems which do not utilize more than 960 channels. The rather narrow frequency range of such frequency discriminator apparatus may be appreciated by an inspection of FIG. 3 wherein the dashed curves AC represent, respectively, plots of the output to input voltage versus angular frequency for the detector circuit means 8, the detector circuit means 10 and the overall differential characteristic of the frequency discriminator apparatus depicted in FIG. 1. In the graphical illustration of FIG. 3, wherein the angular frequency $\omega$ is plotted along the abscissa and the output to input ratio is plotted as the ordinate, the dashed curve A represents a plot of the output to input voltage versus the angular frequency for the detector circuit means 8 whose tuned circuit means 4 is in parallel resonance at an angular frequency $\omega_1$. As indicated, at the parallel resonant angular frequency $\omega_1$, the value of the output to input ratio is maximized exhibiting a clearly defined turning point, however, on either side of the paralleled resonant angular frequency $\omega_1$, as the frequency becomes large or small, the value of the output to input ratio becomes asymptotic to the abscissa exhibiting no clearly defined turning point. Furthermore, as curve A does not rapidly approach zero at a value of angular frequency equal to $\omega_2$, the parallel resonant frequency of the second branch, curve A exhibits substantial linearity only between $\omega_1$ and $\omega_0$, the angular frequency of the carrier. Similarly, the dashed curve B, which represents a plot of the output to input voltage versus the angular frequency for the detector circuit means 10 whose tuned circuit means 6 is in parallel resonance at an angular frequency of $\omega_2$, exhibits a clearly defined minimum point at the parallel resonant angular frequency $\omega_2$; however, on either side of the parallel resonant angular frequency $\omega_2$, as the frequency becomes large or small, the value of the output to input ratio again becomes asymptotic to the abscissa. In addition, as dashed curve B also does not rapidly approach zero at a value of angular frequency equal to $\omega_1$, the parallel resonant frequency of the first branch, dashed curve B manifests substantial linearity only between $\omega_2$ and $\omega_0$. Accordingly, as dashed curve *C*, which illustrates the overall differential characteristic of the frequency discriminator apparatus depicted in FIG. 1, represents the algebraic sum of dashed curves *A* and *B*, it will be seen that the overall frequency discriminator differential characteristic is only linear in a rather narrow angular frequency range which centers at the angular carrier frequency $\omega_0$ and that substantial deviations therefrom will result in excessive distortion. Thus it is manifest that although the conventional frequency discriminator apparatus depicted in FIG. 1 can be utilized in conjunction with narrow frequency range telephony systems, the extension thereof to wide frequency telephony systems is precluded without substantial modification and compensation. However, as previously mentioned, since it is virtually impossible to modify and compensate for the adverse effects of the differential gain characteristic and delay characteristic of such prior art frequency discriminator apparatus, when such discriminator apparatus is utilized in conjunction with a large bandwidth system, without the introduction of substantial additional circuitry and a reduction in the demodulation sensitivity, the adaptation of the frequency discriminator apparatus depicted in FIG. 1 therefor has proved impractical.

Figure 2:
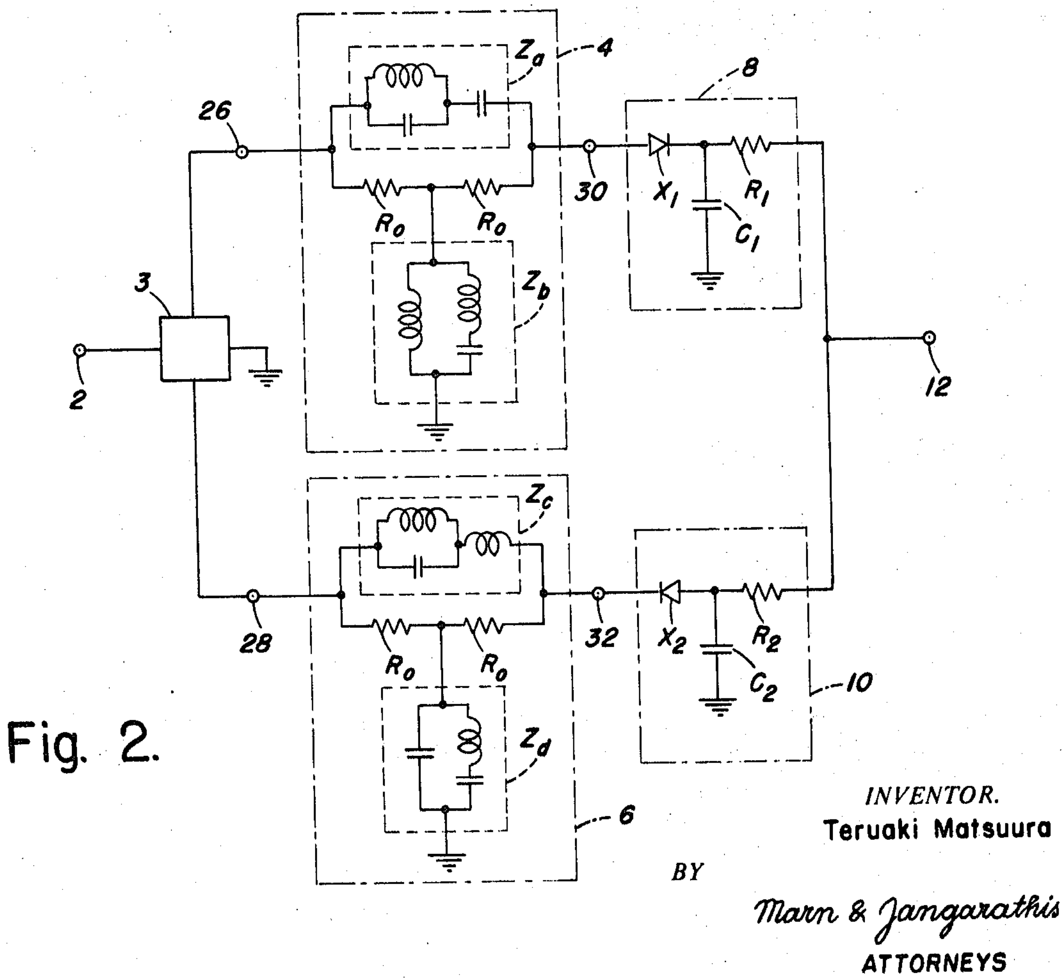
FIG. 2 is a schematic circuit diagram of an embodiment of the frequency discriminator apparatus according to the present invention.

An exemplary embodiment of the frequency discriminator apparatus according to the present invention is illustrated in FIG. 2. As the embodiment of the invention depicted in FIG. 2 includes a plurality of major circuit portions which provide the same function and are commonly positioned within the circuit diagram as those shown in FIG. 1, where applicable, previously utilized reference numerals have been retained to maintain the continuity of this disclosure. The embodiment of the frequency discriminator apparatus according to this invention, as shown by the schematic circuit diagram of FIG. 2, includes input terminal means 2, branching circuit means 3, first and second tuned circuit means 4 and 6 respectively, first and second detector circuit means 8 and 10 respectively, and output terminal means 12. The input terminal means 2 is connected to the branching circuit means 3 which may take the form of any active or passive element or circuit having an output impedance that may be matched by the characteristic resistance $R_0$ and is capable of dividing input signals applied thereto between the input terminals 26 and 28 to the first and second branch circuits respectively. The first branch circuit, comprising the first tuned circuit means 4 and the first detector circuit means 8, is thus connected between an output terminal of the branching circuit means 3 and the output terminal means 12 while the second branch circuit, comprising the second tuned circuit means 6 and the second detector means 10 is connected between another output terminal of the branching circuit means 3 and the output terminal means 12 to thereby form a pair of parallel branch circuits which are symmetrical in character.

The first and second tuned circuit means 4 and 6 respectively each comprise four-terminal circuit means formed of two-terminal network means in combination with other impedance means. Thus, as shown in FIG. 2, the first tuned circuit means 4 may comprise four terminal circuit means formed by the two terminal network means $Z_a$ and $Z_b$ in combination with two characteristic impedances $R_0$ while the second tuned circuit means 6 comprises four terminal circuit means formed by the two terminal network means $Z_c$ and $Z_d$ in combination with two characteristic impedances $R_0$. The two terminal network means $Z_a$ and $Z_c$ should manifest an appropriate value with respect to the two terminal network means $Z_b$ and $Z_d$ respectively so that with respect to the characteristic impedance $R_0$ the following relationships obtain:

$$\frac{Z_a}{R_0}=\frac{R_0}{Z_b}$$

and $$\frac{Z_c}{R_0}=\frac{R_0}{Z_d}$$

The first and second tuned circuit means 4 and 6 which are formed by the four terminal circuit means depicted in FIG. 2 are designed to exhibit a constant resistance and are here shown in a bridged T configuration wherein $Z_a$ and $Z_c$ respectively act as the bridging elements and each of the two terminal network means $Z_a$—$Z_d$ comprise three reactance elements. It should be noted, however, that the bridged tee four terminal circuit means, which include two terminal network means $Z_a$—$Z_d$ d comprising three reactive elements, have only been illustrated in the exemplary embodiment of FIG. 2 because they are highly practical and hence preferred. However, two terminal network means comprising additional reactive elements may also be used in further circuit configurations to form such four terminal circuit means exhibiting constant resistance. Furthermore, a plurality of tuned circuit means, namely a plurality of four terminal circuit means exhibiting constant resistance present in each branch circuit according to this invention may be connected in tandem.

The outputs of the four terminal circuit means which form the first 4 and second 6 tuned circuit means are connected respectively to the input portions of the first 8 and second 10 detector circuit means. The first and second detector circuit means 8 and 10 respectively may take any form well known to those of ordinary skill in the art; however, as the detector circuit means illustrated in FIG. 2 take the identical form as the detector circuit means described with regard to FIG. 1, will not be further described at this time. The outputs of the first and second detector circuit means 8 and 10 are each connected to the output terminal means 12 as aforesaid so that the output signals of the detector circuit means 8 and 10 are differentially detected and combined.

The general operation of the frequency discriminator apparatus depicted in FIG. 2 is similar to that previously described with regard to FIG. 1. Thus, in operation, FM input signals are applied to the input terminal means 2 by portions of the receiver apparatus external to the frequency discriminator apparatus depicted in FIG. 2. The FM input signals received by the input terminal means 2 are applied to the branching circuit means 3 whereupon such FM input signals are divided into first and second FM signal portions. The first and second FM signal portions there obtained are applied respectively to the first 4 and second 6 tuned circuit means present in the first and second branch circuits respectively. The four terminal circuit means forming the first tuned circuit means 4 is tuned to resonance at the angular frequency $\omega_1$, and therefore will selectively alter the waveform of the first portion of such FM signals and apply the same to the first detector circuit means 8 depending upon their relationship to the angular frequency $\omega_1$. The first detector circuit means 8 acts in the well-known manner upon the signals applied thereto by said first tuned circuit means 4 to produce an output voltage whose amplitude will vary with the applied frequency about a given reference level, which reference level occurs at the center angular frequency $\omega_0$. Similarly, the second portion of said FM signals are applied to the second tuned circuit means 6, formed by the four terminal circuit means which is tuned to resonance at the angular frequency $\omega_2$. Accordingly, the second tuned circuit means 6 will selectively alter the waveform of the second portion of the FM signals applied thereto in accordance with their relationship to the angular frequency $\omega_2$ and thereafter apply the same to the second detector circuit means 10. The second detector circuit means 10 acts in the well-known manner upon the signals applied thereto by said second tuned circuit means 6 and produces an output derived therefrom whose amplitude will vary with the applied frequency about a given reference level which again occurs at the center frequency $\omega_0$. The output signals of the first 8 and second 10 detector circuit means are then applied to the output terminal means 12 whereupon the outputs are differentially detected and combined. The resultant output which is present at output terminal means 12 is representative of the demodulated information.

Figure 3:
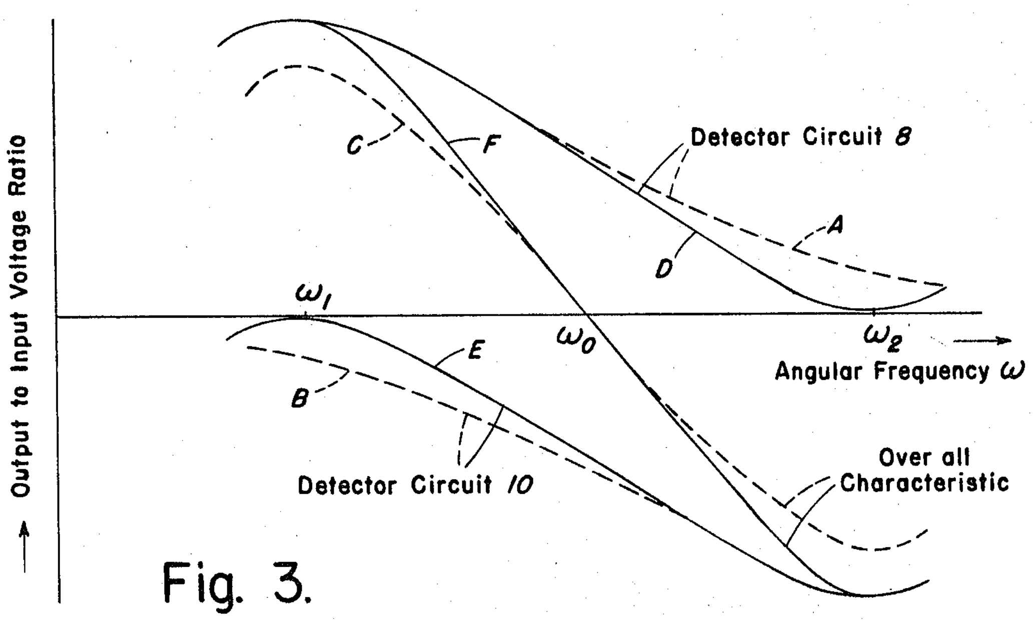
FIG. 3 is a graphical illustration depicting the output to input characteristics of the frequency discriminator apparatus of FIGS. 1 and 2.

The wide bandwidth of the embodiment of the frequency discriminator apparatus depicted in FIG. 2 is illustrated in FIG. 3 wherein the solid curves $D$—$F$ represent the plots of the output to input voltage versus angular frequency for the detector circuit means 8, the detector circuit means 10 and the overall differential characteristic of the frequency discriminator apparatus depicted in FIG. 2. In the graphical illustration of FIG. 3, wherein the angular frequency $\omega$ is plotted along the abscissa and the output to input ratio is plotted as the ordinate, the solid curve D represents a plot of the output to input voltage versus the angular frequency for the detector circuit means 8, as shown in FIG. 2, whose tuned circuit means 4 is tuned for resonance at an angular frequency of $\omega_1$. As indicated, at the tuned angular frequency $\omega_1$, the value of the output to input ratio is maximized exhibiting a clearly defined turning point, however, in contradistinction to the frequency discriminator apparatus depicted in FIG. 1, curve $D$ also exhibits a minimum which resides at a zero ordinate value for an angular frequency of $\omega_2$, the angular frequency at which the tuned circuit means 6 shown in FIG. 2 is tuned for resonance. Accordingly, it will be seen that the solid curve $D$ manifests substantial linearity throughout the entire angular frequency range which resides between the abscissa values of $\omega_1$ and $\omega_2$. Similarly, the solid curve $E$, which represents a plot of the output to input voltage versus the angular frequency for the detector circuit means 10 of FIG. 2 whose tuned circuit means 6 is tuned for resonance at an angular frequency of $\omega_2$, exhibits a clearly defined minimum point at the angular frequency $\omega_2$ and additionally exhibits a maximum which resides at a zero ordinate value for an angular frequency of $\omega_1$, the angular frequency at which the tuned circuit means 4 shown in FIG. 2 is tuned for resonance. Thus, the solid curve $E$ also exhibits substantial linearity throughout the entire angular frequency range which resides between the abscissa values of $\omega_1$ and $\omega_2$. Therefore, as the solid curve F, which depicts the overall differential characteristics of the frequency discriminator apparatus depicted in FIG. 2, represents the algebraic sum of solid curves $D$ and $E$, it will be seen that the overall frequency discriminator differential characteristic is substantially linear throughout the entire angular frequency range which resides between $\omega_1$ and $\omega_2$; accordingly the entire angular frequency range residing between $\omega_1$ and $\omega_2$ may be utilized without substantial distortion to the demodulated information. Thus it will be seen that wide band frequency discriminator apparatus having high demodulation sensitivity can be obtained utilizing the teachings of this invention as heretofore set forth because the $Q$ of the tuned circuit means need not be reduced to accommodate the desired bandwidth.

Figure 4:
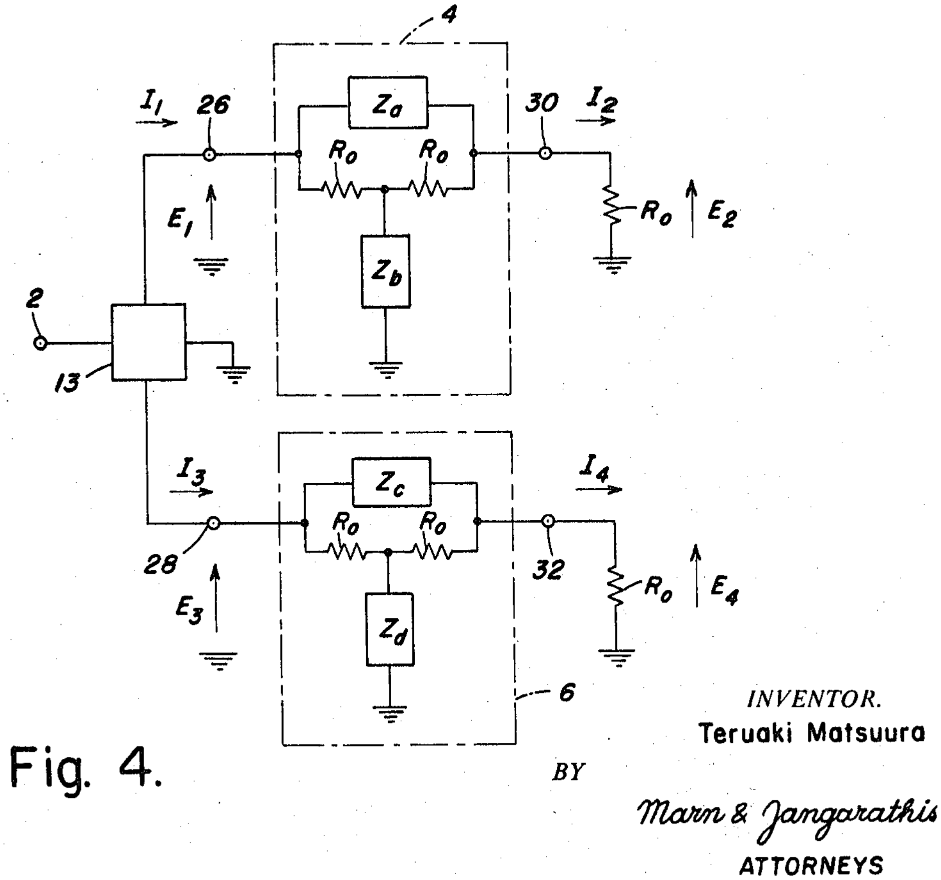
FIG. 4 is an equivalent circuit of the embodiment of this invention illustrated in FIG. 2.

The differential gain characteristic and the delay time characteristic of the embodiment of the frequency discriminator apparatus according to this invention as depicted in FIG. 2 will be further analyzed in connection with the equivalent circuit thereof illustrated in FIG. 4. For the purposes of constructing the equivalent circuit of the embodiment of this invention depicted in FIG. 2, it may be assumed that the input impedances of the detector circuit means 8 and 10, as viewed from the input terminals 30 and 32 thereto, is equal to $R_0$. Accordingly in the equivalent circuit illustrated in FIG. 4, the characteristic impedances $R_0$ have been substituted for the detector circuit means 8 and 10. The remainder of the apparatus depicted in the FIG. 2 embodiment of the frequency discriminator apparatus according to the preset invention has been retained in the equivalent circuit thereof depicted in FIG. 4; however, where necessary for analysis, pertinent nodes have been given appropriate current and voltage designations. The equivalent circuit depicted in FIG. 4 should be referred to where necessary for the proper understanding of the analysis set forth below.

If the four terminal constants of a four terminal circuit means such as the bridged T configuration utilized for the first tuned circuit means 4, as depicted in FIG. 4, are represented as $A$—$D$ respectively, the relationship between the input and output voltage $E_1$ and $E_2$, respectively, and currents $I_1$ and $I_2$, respectively may be represented by the well-known equation:

$$\begin{pmatrix} E_1 \\ I_1 \end{pmatrix} = \begin{pmatrix} AB \\ CD \end{pmatrix} \begin{pmatrix} E_2 \\ I_2 \end{pmatrix} \quad (1)$$

In addition, the ratio $S$ of the output voltage $E_2$ to the input voltage $E_1$ for the case where a bridged T four terminal circuit means is terminated by its characteristic resistance $R_0$, as illustrated in FIG. 4 for the first tuned circuit means 4, may be expressed as:

$$S = \frac{E_2}{E_1} = \frac{1}{A + \frac{B}{R_0}} \quad (2)$$

As stated in Transmission Networks, by Messrs. Nagai and Kamiya, published by the Corona Publishing Co., Ltd., Tokyo, Japan at Table 5.1 on page 87 of the revised edition, $A$ and $B$ may be represented by the following relationships:

$$A = 1 + \frac{Z_a}{2(Z_b + R_0)} \quad (3)$$

and $$B = \frac{R_0(Z_a + 2R_0)}{2(Z_b + R_0)} \quad (4)$$

Thus substituting the expressions for $A$ and $B$ set forth in equations 3 and 4, in equation 2, equation 2 becomes:

$$S = \frac{Z_b + R_0}{Z_a + Z_b + 2R_0} \quad (5)$$

As previously mentioned above, with regard to the description of FIG. 2, the two terminal network means $Z_a$—$Z_d$ utilized in conjunction with the characteristic impedances $R_0$ to form the four terminal, first and second tuned circuit means 4 and 6 are so related that the ratio $Z_a/R_0$ *is equal to the ratio* $R_0/Z_b$ for the first tuned circuit means 4 and the ratio $Z_c/R_0$ is equal to the ratio $R_0/Z_d$ for the second tuned circuit means 6. Accordingly, the relationships for the impedances present within the respective tuned circuit means 4 and 6 may be said to satisfy the following equations:

$$Z_a \cdot Z_b = R_0^2 \quad (6)$$

and $$Z_c \cdot Z_d = R_0^2 \quad (7)$$

Then substituting the expression for $Z_b$ as derived from equation 6 into equation 5, equation 5 may be written as:

$$S = \frac{1}{1 + \frac{Z_a}{R_0}} \quad (8)$$

For the purposes of this description, the two terminal network means $Z_{11}$, $Z_{12}$, $Z_{21}$ and $Z_{22}$, illustrated with their pertinent parameters in the array of the table set forth below, may be assumed to be used for the two terminal network means $Z_a$, $Z_b$, $Z_c$ and $Z_d$, respectively, which are shown in block form in the equivalent circuit of FIG. 4 and in specie in the FIG. 2 embodiment of this invention.

TABLE

| Column 1 | Column 2 |
|---|---|
| 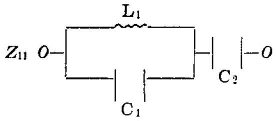  | 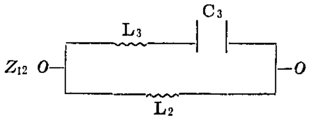  |
| $\frac{Z_{11}}{R_0} = \frac{1}{jQ_{11}x} \cdot \frac{1-x^2}{1-\left(\frac{x}{n}\right)^2}$ | $\frac{Z_{12}}{R_0} = jQ_{12}x \cdot \frac{1-\left(\frac{x}{n}\right)^2}{1-x^2}$ |
| $x = \frac{\omega}{\omega_1}$ | $x = \frac{\omega}{\omega_1}$ |
| $n^2 = 1 + \frac{C_2}{C_1} > 1$ | $n^2 = 1 + \frac{L_2}{L_3} > 1$ |
| $Q_{11} = \omega_1 C_2 R_0$ | $Q_{12} = \frac{\omega_1 L_2}{R_0}$ |
| $\omega_1^2 = \frac{1}{L_1(C_1+C_2)}$ | $\omega_1^2 = \frac{1}{(L_2+L_3)C_3}$ |
| $\omega_2^2 = (n\omega_1)^2 = \frac{1}{L_1C_1}$ | $\omega_2^2 = (n\omega_1)^2 = \frac{1}{L_3C_3}$ |
| 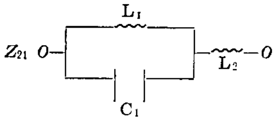  | 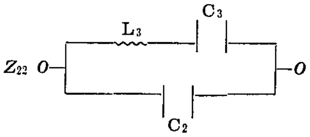  |
| $\frac{Z_{21}}{R_0} = jQ_{21}x \cdot \frac{1-\left(\frac{x}{n}\right)^2}{1-x^2}$ | $\frac{Z_{22}}{R_0} = \frac{1}{jQ_{22}x} \cdot \frac{1-x^2}{1-\left(\frac{x}{n}\right)^2}$ |
| $x = \frac{\omega}{\omega_1}$ | $x = \frac{\omega}{\omega_1}$ |
| $n^2 = 1 + \frac{L_1}{L_2} > 1$ | $n^2 = 1 + \frac{C_3}{C_2} > 1$ |
| $Q_{21} = \frac{\omega_1(L_1+L_2)}{R_0}$ | $Q_{22} = \omega_1(C_2+C_3)R_0$ |
| $\omega_1^2 = \frac{1}{L_1C_1}$ | $\omega_1^2 = \frac{1}{L_3C_3}$ |
| $\omega_2^2 = (n\omega_1)^2 = \frac{1}{\left(\frac{L_1L_2}{L_1+L_2}\right) \cdot C_1}$ | $\omega_2^2 = (n\omega_1)^2 = \frac{1}{L_3 \cdot \frac{(C_3C_2)}{(C_3+C_2)}}$ |

In addition, to facilitate the description 8, follows, it will also be here assumed that the output to input voltage ratios S of the bridged tee four terminal first and second tuned circuit means 4 and 6 are expressed as $S_1(jx)$ and $S_2(jx)$ respectively. Thus turning to the first tuned circuit means 4, which includes the two terminal network means $Z_{11}$ and $Z_{12}$, and appropriately substituting into equation 8, the following equation is obtained:

$$S_1(jx)=\frac{1}{1+\frac{1}{jY_{11}}}=|S_1(jx)|e^{j\theta_1(jx)} \qquad (9)$$

where $$Y_{11}=Q_{11}x\cdot\frac{1-\left(\frac{x}{n}\right)^2}{1-x^2}, \qquad (10)$$

$$|S_1(jx)|=\frac{|Y_{11}|}{\sqrt{1+Y_{11}^2}} \qquad (11)$$

and $$\theta_1(jx)=\frac{\pi}{2}-\tan^{-1}Y_{11} \qquad (12)$$

The differential gain characteristic for the first tuned circuit means 4 as shown in FIGS. 2 and 4 may be obtained by differentiating equation 11 with respect to $x$ while the delay characteristic thereof may be obtained by differentiating equation 12 with respect to the angular frequency $\omega$. Accordingly, the differential gain characteristic and the delay characteristic for the tuned circuit means 4 may be expressed as follows:

$$DG_1(x)=\frac{d}{dx}|S_1(jx)|=\frac{\partial Y_{11}}{\partial x}\cdot\frac{\partial}{\partial Y_{11}}S_1(jx) \qquad (13)$$

$$\tau_1(x)=\frac{d}{d\omega}\theta_1(jx)=\frac{\partial x}{\partial\omega}\cdot\frac{\partial Y_{11}}{\partial x}\cdot\frac{\partial}{\partial Y_{11}}\theta_1(jx) \qquad (14)$$

Therefore substituting equations 10 and 11 into equation 13 and equations 10 and 12 into equation 14; and carrying out the partial differentiation indicated, the following expressions may be obtained:

$$DG_1(x)=Q_{11}\cdot\frac{1+\left(1-\frac{3}{n^2}\right)X^2+\frac{x^4}{n^2}}{(1-x^2)^2}\cdot\frac{1}{(1+Y_{11})^{3/2}} \qquad (15)$$

$$\tau_1(x)=-\frac{Q_{11}}{\omega 1}\cdot\frac{1+\left(1-\frac{3}{n^2}\right)X^2+\frac{x^4}{n^2}}{(1-x^2)^2}\cdot\frac{1}{1+Y_{11}^2} \qquad (16)$$

The output $E_4$ to input $E_3$ voltage ratio $S_2(jx)$ may be obtained for the second tuned circuit means 6, which includes the two terminal network means $Z_{21}$ and $Z_{22}$, in a similar manner to that utilized above in conjunction with the first tuned circuit means 4. Accordingly $S_2(jx)$ may be expressed as follows:

$$S_2(jx)=\frac{1}{1+jY_{21}}=|S_2(jx)|\cdot ej\theta_2(jx) \qquad (17)$$

where $$Y_{21}=Q_{21}\cdot X\cdot\frac{1-(x/n)^2}{1-x^2} \qquad (18)$$

$$|S_2(jx)|=\frac{1}{\sqrt{1+Y_{21}^2}} \qquad (19)$$

and $$\theta_2(jx)=-\tan^{-1}Y_{21} \qquad (20)$$

The differential gain characteristic for the second tuned circuit means 6 as shown in FIGS. 2 and 4 may be obtained by differentiating equation 19 with respect to $x$ while the delay characteristic thereof may be obtained by differentiating equation 20 with respect to the angular frequency $\omega$ in much the same manner as demonstrated above with regard to the first tuned circuit means 4. Accordingly, the following resultant equations for the differential gain characteristic and the delay characteristic for the tuned circuit means 6 are obtained:

$$DG_2(x)=-Q_{21}\cdot\frac{1+\left(1-\frac{3}{n^2}\right)x^2+\frac{x^4}{n^2}}{(1-x^2)^2}\cdot\frac{Y_{21}}{(1+Y_{21}^2)^{3/2}} \qquad (21)$$

and $$\tau_2(x)=-\frac{Q_{21}}{1}\cdot\frac{1+\left(1-\frac{3}{n^2}\right)x^2+\frac{x^4}{n^2}}{(1-x^2)^2}\cdot\frac{1}{1+Y_{21}^2} \qquad (22)$$

The overall differential gain characteristic $DG(x)$ and the overall delay characteristic $\tau(x)$ of the frequency discriminator apparatus as depicted in FIGS. 2 and 4 may be found from the individual characteristics of the respective branch circuits. Thus, when the phase difference between the demodulated outputs of each branch circuit is approximately 180°, the difference between the differential gain characteristics $DG_1(x)$ and $DG_2(x)$ of the first and second branch circuits, respectively, will yield the overall differential gain characteristic $DG(x)$. Similarly, if the amplitudes of the demodulated outputs of the first and second branch circuits are nearly equal, the arithmetic mean of $\theta_1(jx)$ and $\theta_2(jx)$ will give the overall phase characteristic. Therefore, the arithmetic mean of the delay characteristics $\tau_1(x)$ and $\tau_2(x)$ of the first and second branch circuits respectively will yield the overall delay characteristic $\tau(x)$. Accordingly, the overall differential gain characteristic $DG(x)$ and the overall delay characteristic $\tau(x)$ may be expressed as follows:

$$DG(x)=DG_1(x)-DG_2(x)$$

$$=\frac{1+\left(1-\frac{3}{n^2}\right)x^2+\frac{x^4}{n^2}}{(1-x^2)^2}\left\{\frac{Q_{11}}{(1+Y_{11}^2)^{3/2}}+\frac{Q_{21}Y_{21}}{(1+Y_{21}^2)^{3/2}}\right\} \qquad (23)$$

and

*Pat. No.* 3569846

$$\tau(x)=\frac{\tau_1(x)+\tau_2(x)}{2} \qquad (24)$$

$$=-\frac{1}{2}\left(\frac{1}{\omega_1}\right)\frac{1+\left(1-\frac{3}{n^2}\right)x^2+\frac{x^4}{n^2}}{(1-x^2)^2}\left\{\frac{Q_{11}}{1+Y_{11}^2}+\frac{Q_{21}}{1+Y_{21}^2}\right\}$$

When the values of $n=3$, $Q_{11}=1.3$ and $Q_{21}=4.7$ were substituted into equations 23 and 24, and the frequency discriminator apparatus according to this invention, as embodied in FIG. 2, was utilized in an FDM-FM microwave repeater system, the deviation in the resultant differential gain characteristic was less than 1 percent. Further, the overall delay characteristic exhibited a deviation of approximately 0.5 *ns* where the bandwidth present was 70±13 mHz. Accordingly it will be apparent that the frequency discriminator apparatus as taught by the present invention requires no compensation for phase distortion and is highly linear as regards the differential gain characteristic thereof over a wide frequency range. In addition, as the $Q$ of the tuned circuits therein need not be reduced to accommodate such wide frequency range, the demodulation sensitivity thereof is not impaired. Furthermore, as the frequency discriminator apparatus according to the present invention employs four terminal, constant resistance branch circuits therein, the occurrence of echo distortion is minimized.

While the invention has been described in connection with an exemplary embodiment thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

I claim:

1. In frequency discriminator apparatus including input means for receiving FM signals, output means adapted to provide demodulated information signals thereat and first and second branch circuit means electrically connected between said input means and said output means, said first and second branch circuit means each comprising detector circuit means, wherein the improvement comprises:

tuned circuit means in each of said first and second branch circuit means for applying FM signals from said input means to said detector circuit means, each of said tuned circuit means comprising;

a first impedance circuit including three reactive elements electrically interconnected to form a two-terminal network, at least one of said reactive elements being inductive and the remainder of said three elements being capacitive, a pair of serially connected equal value resistance means connected in a shunting relationship across said first impedance circuit, and a second impedance circuit in the form of a two-terminal network connected between a junction formed intermediate said pair of serially connected equal value resistance means and a reference potential, said second impedance circuit in the form of a two-terminal network having an impedance value whose ratio with respect to the value of one of said resistance means is equal to the reciprocal of the ratio of the impedance value of said first impedance circuit with respect to one of said resistance means, said first and second impedance circuit means and said pair of equal value resistance means being connected to form a bridged T four-terminal network configuration, and a branching circuit means interposed between said input means and said first and second branch circuit means for coupling FM signals applied to said input means to said first and second branch circuit means, said branching circuit means exhibiting output impedances which are matched to the resistance means present in said four-terminal network configuration.

2. The apparatus of claim 1 wherein one of said first and second impedance circuit means present in each of said first and second branch circuit means forms the bridging portion of said bridged T network configuration formed in each of said first and second branch circuit means.

3. The apparatus of claim 1 wherein said detector circuit means present within said first and second branch circuit means are matched in input impedance to the resistance means present in said four-terminal network configuration.

4. The apparatus of claim 1 wherein a plurality of said four-terminal network configurations are present in each of said first and second branch circuit means connected in tandem.

PO-1050
(5/69)

UNITED STATES PATENT OFFICE
CERTIFICATE OF CORRECTION

Patent No. 3,569,846 Dated March 9, 1971

Inventor(s) Teruaki MATSUURA

It is certified that error appears in the above-identified patent and that said Letters Patent are hereby corrected as shown below:

Column 1, line 43, after "Q" insert --,--.

Column 2, lines 55 and 56, "terminal" should be --tuned--;

line 56, after "means" insert --4 and--.

Column 3, line 45, "AC" should be --A-C--.

Column 4, line 58, after "four" delete hyphen, after "two" delete hyphen.

Column 5, line 9, "$2_a - 2_d d$" should be --$2_a - 2_d$--.

Column 9, line 1, delete "8," and insert --which-- therefor line 45, equation (15), "$\frac{1}{(1+Y_{11})\ 3/2}$" should be --$\frac{1}{(1+Y_{11}^2)3/2}$--.

Column 10, line 43, between equations (23) and (24), delete "U.S. Pat. No. 3,569,846".

Signed and sealed this 24th day of August 1971.

(SEAL)
Attest:

EDWARD M. FLETCHER, JR.
Attesting Officer

WILLIAM E. SCHUYLER, JR.
Commissioner of Patents